United States Patent

Hildebrand

[11] 3,943,630
[45] Mar. 16, 1976

[54] MEASURING WICKET FOR HEIGHT OF DOGS

[75] Inventor: George Hildebrand, Southbury, Conn.

[73] Assignee: American Kennel Club, New York, N.Y.

[22] Filed: Jan. 3, 1975

[21] Appl. No.: 538,412

[52] U.S. Cl. ............................. 33/169 R; 33/174 D
[51] Int. Cl.² ........................ G01B 5/00; G01B 5/02
[58] Field of Search .......... 33/168 B, 169 R, 174 D

[56] References Cited
UNITED STATES PATENTS

| 325,134 | 8/1885 | Wainwright | 33/169 R |
| 721,800 | 3/1903 | Heatly | 33/169 R |
| 1,457,964 | 6/1923 | Doty | 33/169 R |
| D177,541 | 4/1956 | Wambach, Jr. | 33/169 R |

FOREIGN PATENTS OR APPLICATIONS

| 2,016,905 | 10/1971 | Germany | 33/174 D |

*Primary Examiner*—Richard E. Aegerter
*Assistant Examiner*—Richard R. Stearns
*Attorney, Agent, or Firm*—Kenneth S. Goldfarb

[57] ABSTRACT

A measuring wicket for dogs comprising a U-shaped member having a pair of spaced tubular legs and an interconnecting bar. A cross bar extends between the legs below the interconnecting bar. Each of the legs has a plurality of spaced openings which cooperate with latching means on leg extensions to set the leg extensions at predetermined positions. The degree of extension is viewed by means of the upper most spaced opening through which the leg may be seen, said opening serving as a window for the indicator enscribed on the leg extension. Each opening is numbered to give the exact height of the cross bar with reference to the indicated setting of the leg extension.

5 Claims, 4 Drawing Figures

MEASURING WICKET FOR HEIGHT OF DOGS

BACKGROUND OF THE INVENTION

1. Field of the Invention

This invention relates to the class of measuring instruments and more particularly to a wicket for measuring the height of a dog.

2. Description of the Prior Art

At dog shows, in those breeds where certain heights are specified in the standard for the particular breed as disqualifications or in any class where the conditions include a height specification, the dog show judge may be required to make a determination as to whether any dog measures within the specified limits. In the past, various types of equipment have been used which have resulted in considerable difficulties in providing for an accurate determination of the height of the dog. This is because it is often difficult to cause the dog under consideration to stand in an erect manner for a period long enough for the accurate measurement using rulers, tape measures, or the like, to be employed.

The problem presented is to provide a device which in a positive manner will assure accurate measurement in a very short time and with the dog shifting in the position of its shoulders and the like so that a reading of less than the dog's actual height cannot be made because the dog is incorrectly positioned during the measurement.

SUMMARY OF THE INVENTION

The present invention conceives of a wicket which is placed across the dog's shoulders in such a manner that if both legs of the wicket touch the ground at all times while the dog is being measured and with the shoulders being shifted, the dog will be considered as being under the particular height for which the wicket is set. The invention conceives of two different size adjustable wickets covering all of the various sizes for the various breeds for which height standards have been set and so arranged that the height to which a wicket has been set may be easily ascertained by the judge using the wicket. Each wicket is of U-shape and includes a pair of telescopic legs including tubular leg members provided with a plurality of side apertures therethrough and further including a pair of leg extensions provided with a series of spaced notches therein. Ball detent latching means are provided for conveniently seating the wicket in a predetermined height position. A cross bar for seating on the shoulder of the dog being measured is provided and the space between the top bar of the wicket and the cross bar allows for convenient use of the top bar of the wicket as a handle for placing the wicket on the dog without in any way alarming or discomforting the dog being measured.

It is therefore an object of the invention to provide a measuring wicket for dogs that will enable an individual judge to conveniently and accurately measure the height of a dog thereby eliminating previous difficulties heretofore present in measuring dogs at dog shows and further eliminating the need for measuring committees to obtain accurate measurements.

Still further objects and features of this invention reside in the provision of measuring wickets for dogs that is simple in construction, inexpensive to manufacture thereby permitting wide use and distribution to dog show holding clubs so as to facilitate familiarity with such measuring wickets, which will speed up dog show judging by providing for quicker and more accurate determination of the height of a dog, and which is telescopic in construction, thereby permitting the use of the wicket for a wide variety of heights of dogs.

These, together with the various ancillary objects and features of the present invention, which will become apparent as the following description proceeds, are attained by this measuring wicket for determination of a dog's height, a preferred embodiment of which is illustrated in the accompanying drawing, by way of example only, wherein:

DETAILED DESCRIPTION OF THE PREFERRED EMBODIMENT

Figure 1:
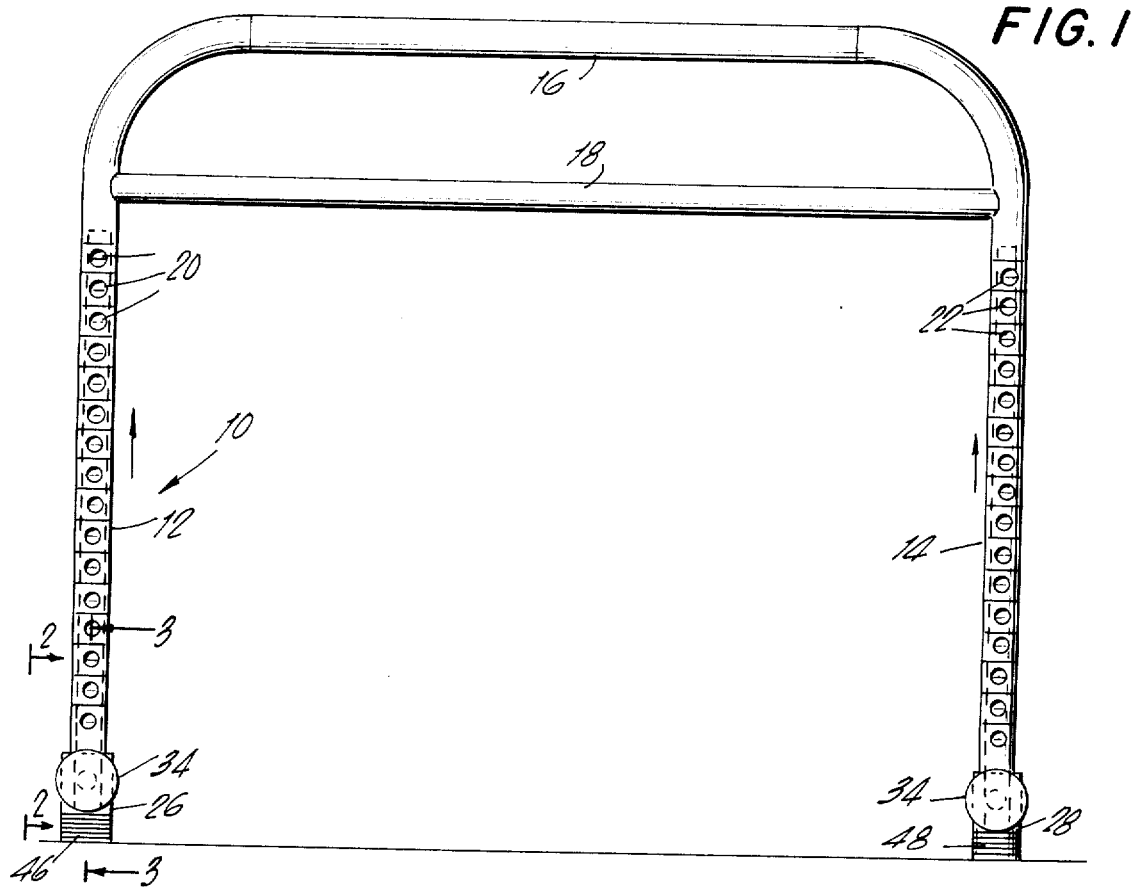
FIG. 1 is a side elevational view of a measuring wicket constructed in accordance with the concepts of the present invention.
Figure 2:
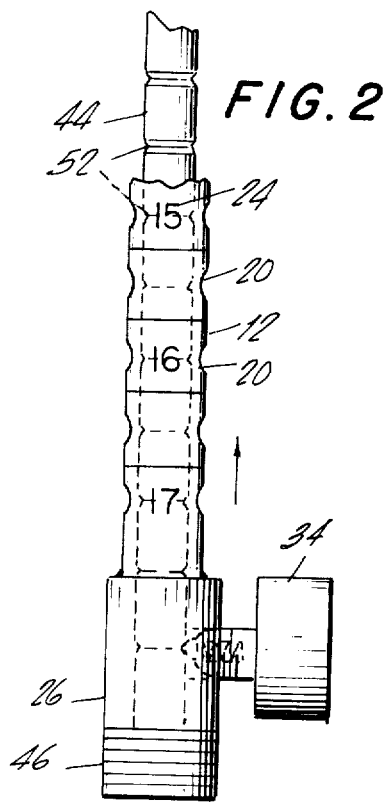
FIG. 2 is an enlarged partial elevational view, illustrating a tubular leg and leg extensions.
Figure 3:
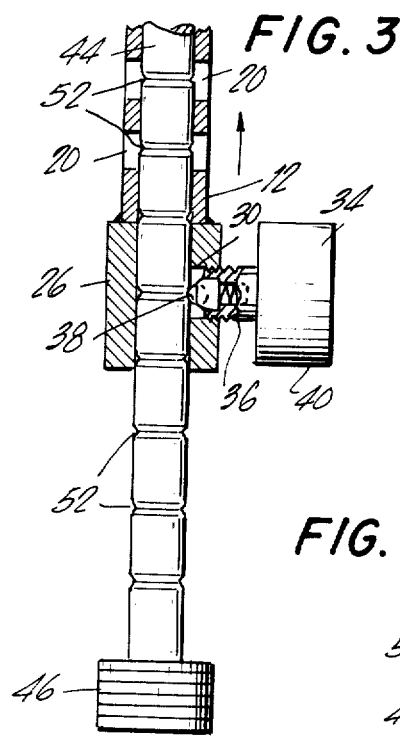
FIG. 3 is an enlarged vertical view, taken along the plane of line 3—3 in FIG. 1.
Figure 4:
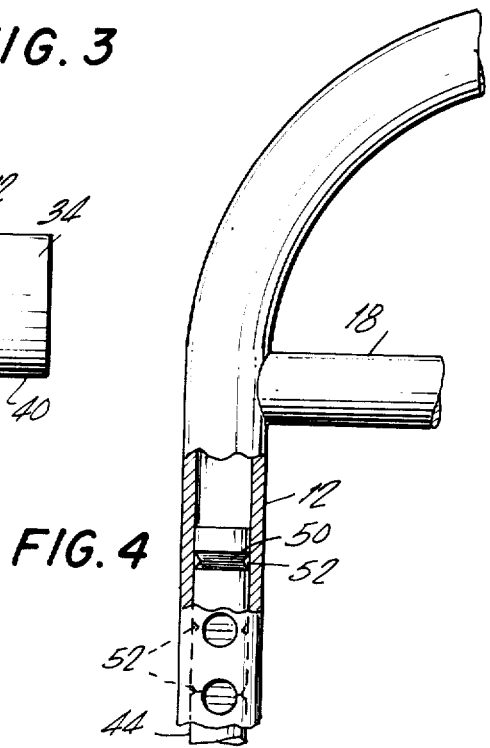
FIG. 4 is a partial elevational view with parts being broken away to show other parts in section illustrating details of construction of the present invention.

With continuing reference to the accompanying drawing, wherein like reference numerals designate similar parts throughout the various view, reference numeral 10 is used to generally designate a measuring wicket for dogs constructed in accordance with the concepts of the present invention. The measuring wicket 10 includes a pair of tubular legs 12 and 14 interconnected by an interconnecting bar 16 forming a general U-shaped member. The tubular legs 12 and 14 are also interconnected by a cross bar 18 spaced below and parallel to the interconnecting bar 16. Hence, the space between the interconnecting bar 16 and the cross bar 18 permits the positioning of the hand of the user and upon grasping of the interconnecting bar 16, the entire wicket may be raised, lowered, and positioned over the shoulders of a dog in a convenient fashion.

The legs 12 and 14 have respectively a series of spaced openings 20 and 22 therin, the openings being spaced preferably exactly one-half inch apart. Indicia for indicating height as indicated at 24 is provided on one or both legs 12 and 14 between the spaced openings 20. Secured as by welding, brazing, bonding or the like to the legs 12 and 14 are enlarged tubular bosses 26 and 28. Each of these bosses 26 and 28 have internally threaded openings 30 therein and a latching means 34 including a set screw 36 provided with a spring pressed ball detent 38 and an enlarged head 40 are provided and are threaded in the opening 30.

A pair of leg extensions 44 are provided having enlarged feet 46 and 48 below the legs. The extensions 44 are telescopically slideable within the legs 12 and 14 and may be selectively latched in an adjusted position through use of the latching members 34. Indexing indicia 50 may be provided on one of the legs such as at one of a series of spaced grooves 52 provided for each of the leg extensions. The ball detents 38 are adapted to sit in the grooves 52 and hold the leg extensions in the locked position with the screws 36 threadedly engaged in an inward position. Then, peering through the opening 20, the indicia 50, which may be colored, will provide a clear indication in cooperation with the indicia 24 as to the height setting of the wicket 10.

In use, the judge preferably approaching the dog from behind may slip the wicket directly over the dog's shoulders and moving the wicket slightly in that area determine if both leg extension feet 46 and 48 rest on the ground. If this is the case, the dog measures under the height to which the wicket has been set. If, with slight movement of the dog or wicket, one of the leg extension feet 46 and 48 are raised, the dog is obviously taller than the height setting of the wicket. The wicket is preferably made in two different sizes to accommodate the girth of the animal ranging from a relatively small height for small size or toy breeds, as for example the toy poodle, to very sizeable dogs, such as the Great Dane.

A latitidue of modification, substitution and change is intended in the foregoing disclosures, and in some instances some features of the present invention may be employed without a corresponding use of other features.

I claim:

1. A measuring wicket for dogs comprising a U-shaped member having a pair of spaced tubular legs and an interconnecting bar, a cross bar below said interconnecting bar and extending between said legs and secured thereto, a plurality of spaced openings in each of said legs, leg extensions slidably telescopically received in said legs, indexing grooves in said extensions co-operable with said openings to indicate the effective height of said cross bar, and locking means secured to each of said legs for engagement with the associated leg extension in said grooves for selectively locking each of said leg extensions in an adjusted position.

2. A measuring wicket for dogs according to claim 1, wherein each said locking means includes a spring pressed ball detent seatable in said grooves.

3. A measuring wicket for dogs according to claim 2, including enlarged bosses at the bottom of said legs, and enlarged feet on said leg extensions.

4. A measuring wicket for dogs according to claim 2, including enlarged bosses at the bottom of said legs, said locking means being threadedly secured in said bosses.

5. A measuring wicket for dogs according to claim 4, including enlarged feet on said leg extensions of larger diameter than the internal diameter of said bosses.

* * * * *